(12) United States Patent
Kothari et al.

(10) Patent No.: US 12,361,350 B2
(45) Date of Patent: Jul. 15, 2025

(54) METHOD FOR AUTONOMOUS VEHICLE RESOURCE ALLOCATION AND SCHEDULING

(71) Applicant: Volkswagen Group of America Investments, LLC, Reston, VA (US)

(72) Inventors: Parul Kothari, New York, NY (US); Noe Brito, Cupertino, CA (US); Juanqui Yu, New York, NY (US); Peter Hoang, Houston, TX (US); Han Nguyen, Palo Alto, CA (US); Vicente Quinones, Hialeah, FL (US); Karson Stone, Austin, TX (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 234 days.

(21) Appl. No.: 18/156,986

(22) Filed: Jan. 19, 2023

(65) Prior Publication Data
US 2024/0249218 A1    Jul. 25, 2024

(51) Int. Cl.
*G06Q 10/0631* (2023.01)
*B60W 60/00* (2020.01)
*G06Q 50/40* (2024.01)

(52) U.S. Cl.
CPC ........... *G06Q 10/063118* (2013.01); *B60W 60/00253* (2020.02); *G06Q 10/063112* (2013.01); *G06Q 50/40* (2024.01); *B60W 2556/40* (2020.02)

(58) Field of Classification Search
CPC ....... G06Q 10/00; G06Q 50/00; B60W 60/00; B60W 2556/00
See application file for complete search history.

(56) References Cited

U.S. PATENT DOCUMENTS

| | | | | |
|---|---|---|---|---|
| 11,367,356 B1* | 6/2022 | Ketharaju | ......... | B60W 60/0025 |
| 11,636,563 B1* | 4/2023 | Ditaranto | ............... | G06Q 50/40 |
| | | | | 705/7.16 |
| 2007/0173993 A1* | 7/2007 | Nielsen | ................... | G06Q 10/06 |
| | | | | 701/33.4 |
| 2012/0089432 A1* | 4/2012 | Podgurny | ......... | G06Q 10/06311 |
| | | | | 705/7.13 |
| 2021/0107519 A1* | 4/2021 | Gassmann | ............. | G06Q 50/40 |
| 2021/0403048 A1* | 12/2021 | Nguyen | ................ | B60W 10/30 |
| 2022/0244058 A1* | 8/2022 | Cong | ................. | G01C 21/3484 |
| 2022/0300011 A1* | 9/2022 | Chen | ...................... | B25J 11/008 |

(Continued)

*Primary Examiner* — Aniss Chad
*Assistant Examiner* — Elizabeth J Slowik
(74) *Attorney, Agent, or Firm* — Fox Rothschild LLP

(57) ABSTRACT

This document discloses system, method, and computer program product embodiments for preparing a fleet of vehicles for service. For example, the method includes receiving: a set of mission types, a set of mission requests, vehicle information related to vehicles of a fleet, and personnel information. The method further includes applying the set of mission types and the set of mission requests to one or more priority engines to produce a prioritized list of mission requests. The method further includes applying the received vehicle information, the received personnel information, and the prioritized list of mission requests to one or more rules engines to produce a proposed schedule of missions for a period of time, generating software and/or map data for one or more of the vehicles, and providing the generated software and/or map data to the vehicles prior to the period of time.

20 Claims, 12 Drawing Sheets

(56) References Cited

U.S. PATENT DOCUMENTS

| | | | | |
|---|---|---|---|---|
| 2022/0366369 A1* | 11/2022 | Nice | ............... | G08G 1/20 |
| 2023/0343150 A1* | 10/2023 | Salter | ............... | G07C 5/0841 |
| 2024/0036571 A1* | 2/2024 | Goldman | ............... | G05D 1/0038 |
| 2024/0210188 A1* | 6/2024 | Bonekamp | ............... | G01C 21/3469 |

* cited by examiner

400

Resource Request

< Back

Information

| | |
|---|---|
| Requesting Department | Mission Type |
| Select Department ▾ | Select Mission Type ▾ |
| AV Platform | Number of cars |
| Select AV Platform ▾ | Select Number of Cars ▾ |
| Metro | Map type |
| Select Metro ▾ | Select Map Type ▾ |
| CAVO/OSA/ST ID (Optional) | AV ID(s) (Optional) |
| Select Person ▾ | Select AV ID(s) ▾ |
| Software Release (Optional) | Request Recurrence (Optional) |
| Select Software Release ▾ | Repeat every |
| Days & Hours (Optional) | 1  week ▾ |
| Day | Repeat On |
| Select Day 🗓 | (Tuesday ⊙) ▾ |
| From    To | Ends |
| Select start Time ⋄ Select End Time | ⊙ Never |
| | ○ On  Aug, 9, 2022 🗓 |
| | ○ After  13 occurances |

Cancel  [Submit]

| VEHICLES 21 | MONDAY 04 | TUESDAY 05 | WEDNESDAY 06 | THURSDAY 07 | FRIDAY 08 |
|---|---|---|---|---|---|
| ATX Z3 | | | | | |
| Z3F0016 | 12:01 PM - 3:00 PM<br>Request: #12345<br>Driver: Peter Hoang<br>Co-Driver: Nicole Yu<br><br>3:01 PM - 4:45 PM<br>Request: #12345<br>Driver: Peter Hoang<br>Co-Driver: Nicole Yu<br><br>3:01 PM - 4:45 PM<br>Request: #12345<br>Driver: Peter Hoang<br>Co-Driver: Nicole Yu | 12:01 PM - 3:00 PM<br>Request: #12345<br>Driver: Peter Hoang<br>Co-Driver: Nicole Yu<br><br>3:01 PM - 4:45 PM<br>Request: #12345<br>Driver: Peter Hoang<br>Co-Driver: Nicole Yu | 12:01 PM - 3:00 PM<br>Request: #12345<br>Driver: Peter Hoang<br>Co-Driver: Nicole Yu<br><br>3:01 PM - 4:45 PM<br>Request: #12345<br>Driver: Peter Hoang<br>Co-Driver: Nicole Yu | | 12:01 PM - 3:00 PM<br>Request: #12345<br>Driver: Peter Hoang<br>Co-Driver: Nicole Yu<br><br>3:01 PM - 4:45 PM<br>Request: #12345<br>Driver: Peter Hoang<br>Co-Driver: Nicole Yu |
| Z3F0017 | 3:01 PM - 4:45 PM<br>Request: #12345<br>Driver: Peter Hoang<br>Co-Driver: Nicole Yu | 3:01 PM - 4:45 PM<br>Request: #12345<br>Driver: Peter Hoang<br>Co-Driver: Nicole Yu | 3:01 PM - 4:45 PM<br>Request: #12345<br>Driver: Peter Hoang<br>Co-Driver: Nicole Yu<br><br>12:01 PM - 3:00 PM<br>Request: #12345<br>Driver: Peter Hoang<br>Co-Driver: Nicole Yu | 3:01 PM - 4:45 PM<br>Request: #12345<br>Driver: Peter Hoang<br>Co-Driver: Nicole Yu<br><br>12:01 PM - 3:00 PM<br>Request: #12345<br>Driver: Peter Hoang<br>Co-Driver: Nicole Yu | 3:01 PM - 4:45 PM<br>Request: #12345<br>Driver: Peter Hoang<br>Co-Driver: Nicole Yu<br><br>12:01 PM - 3:00 PM<br>Request: #12345<br>Driver: Peter Hoang<br>Co-Driver: Nicole Yu |
| Z3F0018 | 7:00 PM - 3:00 PM<br>Request: #12345<br>Driver: Peter Hoang<br>Co-Driver: Nicole Yu | 12:01 PM - 3:00 PM<br>Request: #12345<br>Driver: Peter Hoang<br>Co-Driver: Nicole Yu<br><br>3:01 PM - 4:45 PM | 12:01 PM - 3:00 PM<br>Request: #12345<br>Driver: Peter Hoang<br>Co-Driver: Nicole Yu<br><br>3:01 PM - 4:45 PM | | |

FIG. 5B

Driver Management

600a

| Driver | | Availability | | Certifications | |
|---|---|---|---|---|---|
| Select | ▼ | Select | ▼ | Select | ▼ | Reset Filters |

Availability  Manage Delivers  Time off Requests

Submit Time Off     Create New Driver

| Driver ◆ | Metro ◆ | Driver Type ◆ | Certifications ◆ | Actions |
|---|---|---|---|---|
| John Doe | ATX | Test Specialist | (Mapping) (Labeling) (Demo) (Pilot: Lyft/Walmart) (Test-Ops/VTRs) (Training) | *Edit* *Remove* |
| John Doe | MIA | Test Specialist | (Mapping) (Labeling) (Demo) (Pilot: Lyft/Walmart) (Test-Ops/VTRs) (Training) | *Edit* *Remove* |
| John Doe | MIA | Test Specialist | (Mapping) (Labeling) (Demo) (Pilot: Lyft/Walmart) (Test-Ops/VTRs) (Training) | *Edit* *Remove* |
| John Doe | MIA | Test Specialist | (Mapping) (Labeling) (Demo) (Pilot: Lyft/Walmart) (Test-Ops/VTRs) (Training) | *Edit* *Remove* |
| John Doe | ATX | Test Specialist | (Mapping) (Labeling) (Demo) (Pilot: Lyft/Walmart) (Test-Ops/VTRs) (Training) | *Edit* *Remove* |
| John Doe | ATX | Test Specialist | (Mapping) (Labeling) (Demo) (Pilot: Lyft/Walmart) (Test-Ops/VTRs) (Training) | *Edit* *Remove* |

FIG. 6A

Driver Management

Driver | Availability | Certifications
Select | Select | Select | Reset Filters

Submit Time Off | Create New Driver

Availability | Manage Drivers | Time off Requests

May 9 - 15 | Today | ← Last Week | Next Week → | Week ▾

| DRIVERS 20 | MONDAY 09 | TUESDAY 10 | WEDNESDAY 11 | THURSDAY 12 | FRIDAY 13 | SATURDAY 14 | SUNDAY 15 |
|---|---|---|---|---|---|---|---|
| ⊗ Smith, John | All Day | All Day | All Day | All Day | All Day | All Day | All Day |
| ⊗ Smith, John | All Day | All Day | Sick Day: Full Day | All Day | All Day | All Day | All Day |
| ⊗ Smith, John | All Day | All Day | All Day | All Day | All Day | All Day | All Day |
| ⊗ Smith, John | All Day | All Day | All Day | Personal Day: Full Day | All Day | All Day | All Day |
| ⊗ Smith, John | All Day | Personal Day: 7:00 AM - 9:00 AM | All Day | All Day | | | |
| ⊗ Smith, John | All Day | All Day | All Day | All Day | | | |

FIG. 6B

Vehicle Management

| Platform | | Vehicle ID | | Serivce Status | | Metro | | Mission Eligibility | | Mission Availability | |
|---|---|---|---|---|---|---|---|---|---|---|---|
| Select Platform | ∨ | Select Vehicle ID | ∨ | Select Service Status | ∨ | Select Metro | ∨ | Select Mission Eligibility | ∨ | Select Mission Availability | ∨ Reset Filters |

| Platform | Vehicle ID | Service Status | Metro | Mission Eligibility | Mission Availability | Actions |
|---|---|---|---|---|---|---|
| Z2F | Z3F0001 | Good | MIA | (Lyft) (Walmart) | (Available) | Edit |
| Z2T | Z3F0002 | Not Good | ATX | (Lyft) (Walmart) (Mapping) (Service) | (Not available) | Edit |
| Z3F | Z3F0003 | Good | ATX | (Lyft) (Walmart) (Service) | (Available) | Edit |
| Z3F | Z3F0004 | Good | MIA | (Lyft) (Demos) | (Available) | Edit |
| Z3F | Z3F0005 | Good | ATX | (Lyft) | (Available) | Edit |
| Z3F | Z3F0006 | Not Good | MIA | (Lyft) (Walmart) (Mapping) | (Not available) | Edit |

METHOD FOR AUTONOMOUS VEHICLE RESOURCE ALLOCATION AND SCHEDULING

BACKGROUND

Services that operate, manage, and/or serve as dispatchers for multiple vehicles exist to support many applications. For example, a vehicle service provider may operate vehicles that pick up and deliver packages, that pick up and deliver restaurant orders, and/or that provide ride sharing or taxi services to human riders. In some cases, the vehicles that a single service provider manages may have multiple assigned purposes. The assigned purposes may vary from vehicle to vehicle, or even by time of day or tenant assignment for a single vehicle.

The use of autonomous vehicles (AVs) for purposes such as those described above is increasing. As AV technology advances, demands for AVs and AV technology increases. Scarce or finite AV resources, competing requests from various (and geographically distributed) stakeholders, and dynamically changing conditions (e.g., inclement weather, vehicle breakdowns, etc.) provide additional obstacles to efficient management of AV fleets responsively and at scale.

This document describes methods and systems that are directed to addressing the problems described above, and/or other issues.

SUMMARY

At least some of the problems associated with the existing solutions will be shown solved by the subject matter of the independent claims that are included in this document. Additional advantageous aspects are discussed in the dependent claims.

In a first set of embodiments, a method of preparing a fleet of vehicles for service is disclosed. The method includes receiving data including: a set of mission types, each mission type having an associated priority; a set of mission requests, each mission request having an associated mission type; vehicle information related to vehicles of a fleet, the vehicle information including vehicle capabilities; and personnel information related to one or more personnel, the personnel information including personnel qualifications. The method further includes applying the set of mission types and the set of mission requests to one or more priority engines to produce a prioritized list of mission requests. The method further includes applying the received vehicle information, the received personnel information, and the prioritized list of mission requests to one or more rules engines to produce, based on the personnel qualifications and the vehicle capabilities, a proposed schedule of missions for a period of time, such that each scheduled mission is assigned to a corresponding vehicle of the fleet and corresponding one or more of the personnel. The method further includes generating software and/or map data for one or more of the vehicles based on its assigned mission and providing the generated software and/or map data to the one or more of the vehicles prior to the period of time.

In other embodiments, a system includes a memory and at least one processor coupled to the memory and configured to receive data. The data includes a set of mission types, each mission type having an associated priority; a set of mission requests, each mission request having an associated mission type; vehicle information related to vehicles of a fleet, the vehicle information including vehicle capabilities; and personnel information related to one or more personnel, the personnel information including personnel qualifications. The at least one processor is further configured to apply the set of mission types and the set of mission requests to one or more priority engines to produce a prioritized list of mission requests. The at least one processor is further configured to apply the received vehicle information, the received personnel information, and the prioritized list of mission requests to one or more rules engines to produce, based on the personnel qualifications and the vehicle capabilities, a proposed schedule of missions for a period of time, such that each scheduled mission is assigned to a corresponding vehicle of the fleet and corresponding one or more of the personnel. The at least one processor is further configured to generate software and/or map data for one or more of the vehicles based on its assigned mission and provide the generated software and/or map data to the one or more of the vehicles prior to the period of time.

In other embodiments, a non-transitory computer-readable medium is disclosed. The non-transitory computer-readable medium stores instructions that, when executed by at least one computing device, will cause the at least one computing device to perform operations. The operations include receiving data including: a set of mission types, each mission type having an associated priority; a set of mission requests, each mission request having an associated mission type; vehicle information related to vehicles of a fleet, the vehicle information including vehicle capabilities; and personnel information related to one or more personnel, the personnel information including personnel qualifications. The operations further include applying the set of mission types and the set of mission requests to one or more priority engines to produce a prioritized list of mission requests. The operations further include applying the received vehicle information, the received personnel information, and the prioritized list of mission requests to one or more rules engines to produce, based on the personnel qualifications and the vehicle capabilities, a proposed schedule of missions for a period of time, such that each scheduled mission is assigned to a corresponding vehicle of the fleet and corresponding one or more of the personnel. The operations further include generating software and/or map data for one or more of the vehicles based on its assigned mission and providing the generated software and/or map data to the one or more of the vehicles prior to the period of time.

The methods described above may be embodied in a system including a processor and memory containing programming instructions that, when executed, will cause the processor to implement the actions described above. Various embodiments also include a computer program product that contains such programming instructions, and a memory containing the computer program product.

BRIEF DESCRIPTION OF THE DRAWINGS

The accompanying drawings are incorporated into this document and form a part of the specification.

FIG. 4 depicts a screenshot of an example mission request form.

FIG. 5A depicts a screenshot of an example proposed schedule.

FIG. 5B depicts a screenshot of an example final schedule.

FIGS. 6A and 6B depict screenshots of an example driver management interface.

FIG. 7 depicts a screenshot of an example vehicle management interface.

In the drawings, like reference numbers generally indicate identical or similar elements. Additionally, generally, the left-most digit(s) of a reference number identifies the drawing in which the reference number first appears.

DETAILED DESCRIPTION

Figure 1:
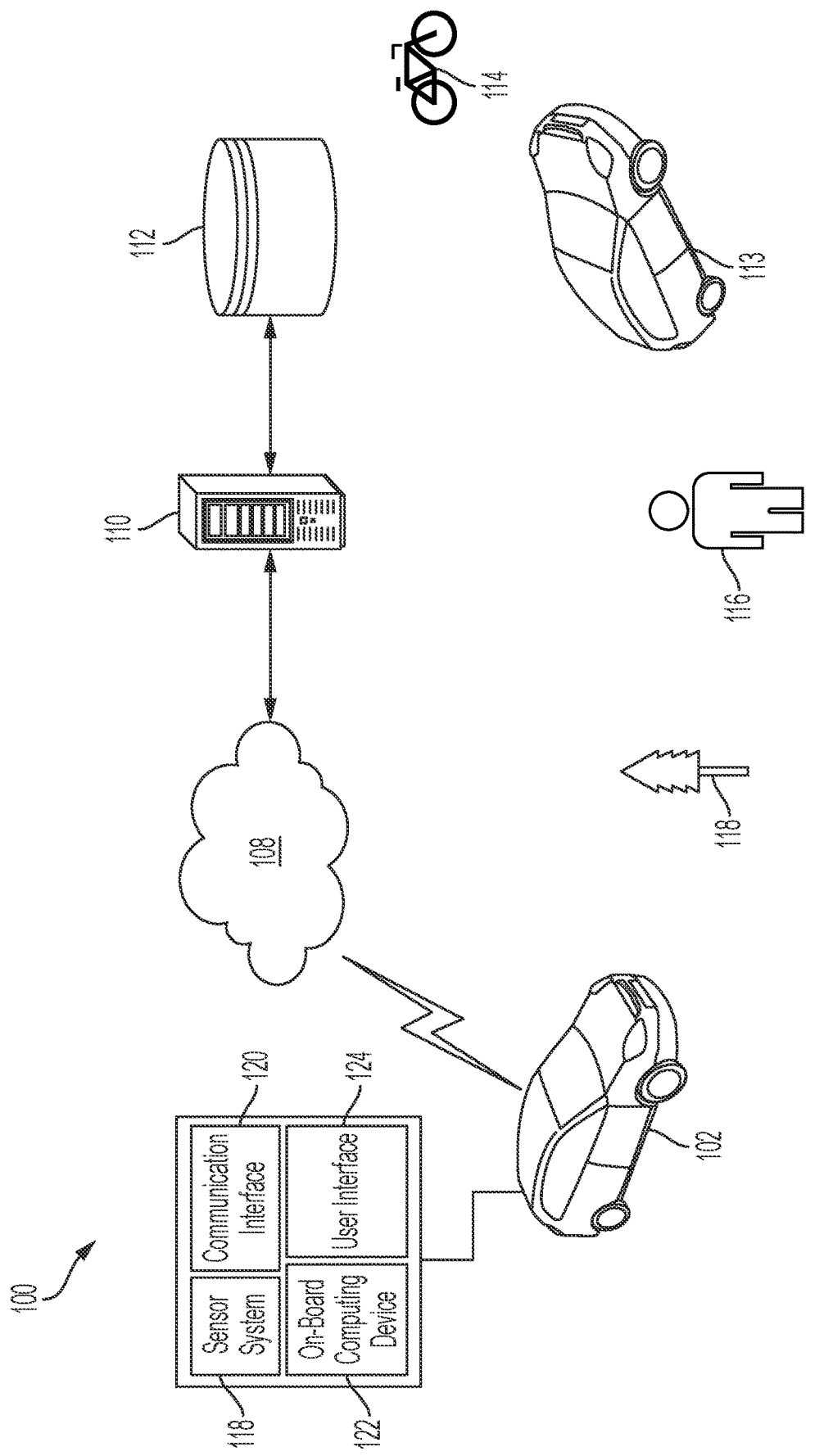
FIG. 1 illustrates an example autonomous vehicle system, in accordance with aspects of the disclosure.

This document describes system, apparatus, device, method and/or computer program product embodiments, and/or combinations and sub-combinations of any of the above, for efficiently managing fleets of autonomous vehicles (AVs) responsively and at scale. Fleets of AVs may be deployed and managed in particular geographical regions, e.g., where the fleet has received regulatory approval to operate. Within these regions, the fleet may be tasked with performing a variety of missions, including testing, training, mapping, calibrating sensors, delivering goods (such as meals), transporting people, and so forth, over short or long distances. These missions may be requested by (possibly geographically distributed) stakeholders competing for AV resources. Each mission type (or each mission) may require particular AV configurations or resources, such as particular AV software versions or hardware (e.g., sensor) configurations, particular types of support personnel (e.g., qualified remote operators), particular map data, and so forth. In some examples, all missions are performed by vehicles of a common fleet. That is, any particular AV may, after completing one type of mission, perform a different type of mission and/or for a different stakeholder. In other examples, subsets of the fleet are dedicated to particular missions (or particular stakeholders, e.g., to satisfy service-level agreements). For example, a commercial partner may contract with the fleet to perform a minimum number of missions per day, or to dedicate a minimum number of vehicles to the partner's missions during each shift (or each day), or to perform a minimum value of commercial activity on behalf of the partner. In one example, an agreement may specify a minimum number of vehicles dedicated to providing a ride-sharing service within a geographical area, and/or to provide a minimum number of rides (or, e.g., passenger-miles of rides) per day. The agreement may specify required (or merely preferred) vehicle configurations and/or required (or merely preferred) personnel requirements for performing missions. Individual missions may be scheduled to occur during predetermined and/or recurring time periods of time, such as morning or afternoon shifts. Even when missions are scheduled according to shifts, last-minute (or even intra-shift) adjustments may be required to address exigent and/or emerging circumstances.

A fleet scheduling system includes a software-based, systematic approach to collecting and centrally managing relevant information. The system methodically applies scheduling algorithms to the information to schedule vehicles for discrete time periods (e.g., shifts) and present the schedule to a test manager for review and approval. The system identifies scheduling conflicts and underutilized resources and flags those (and other) issues for particular review. Once approved, the system prepares the vehicles for their assigned mission, e.g., by generating required software configurations and/or versions, and/or generating required map data. AVs may not have sufficient memory to store multiple configurations. Therefore, the system may also download the software and map information to the corresponding AVs prior to the start of a shift. In this case, all missions performed by the AV during the shift use the same software and mapping configuration, which may add additional complexity to scheduling. The system also pushes relevant data to stakeholders, e.g., indicating compliance with service-level agreements, and the system continually acquires scheduling performance metrics, allowing the system to optimize scheduling algorithms over time.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

A "fleet" is a group of vehicles that are centrally managed, monitored, and maintained by a fleet operator to provide Transportation as a Service (TaaS) to requesters. Requesters may include business entities, (e.g., that partner with the fleet provider), internal stakeholders within the fleet provider, and even virtual requesters, e.g., generated by fleet-management software.

Definitions for additional terms that are relevant to this document are included at the end of this Detailed Description.

FIG. 1 illustrates an example system 100, in accordance with aspects of the disclosure. System 100 comprises a vehicle 102 that is traveling along a road in a semi-autonomous or autonomous manner. Vehicle 102 is also referred to in this document as AV 102. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 is generally configured to detect objects in its proximity. The objects can include, but are not limited to, a vehicle 113, cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. Autonomous vehicle system 100 may further include certain components (as illustrated, for example, in FIG. 8) included in vehicles, which may be controlled by the on-board computing device 122 using a variety of communication signals and/or commands, such as, for example, acceleration signals or commands, deceleration signals or commands, steering signals or commands, braking signals or commands, etc.

Figure 8:
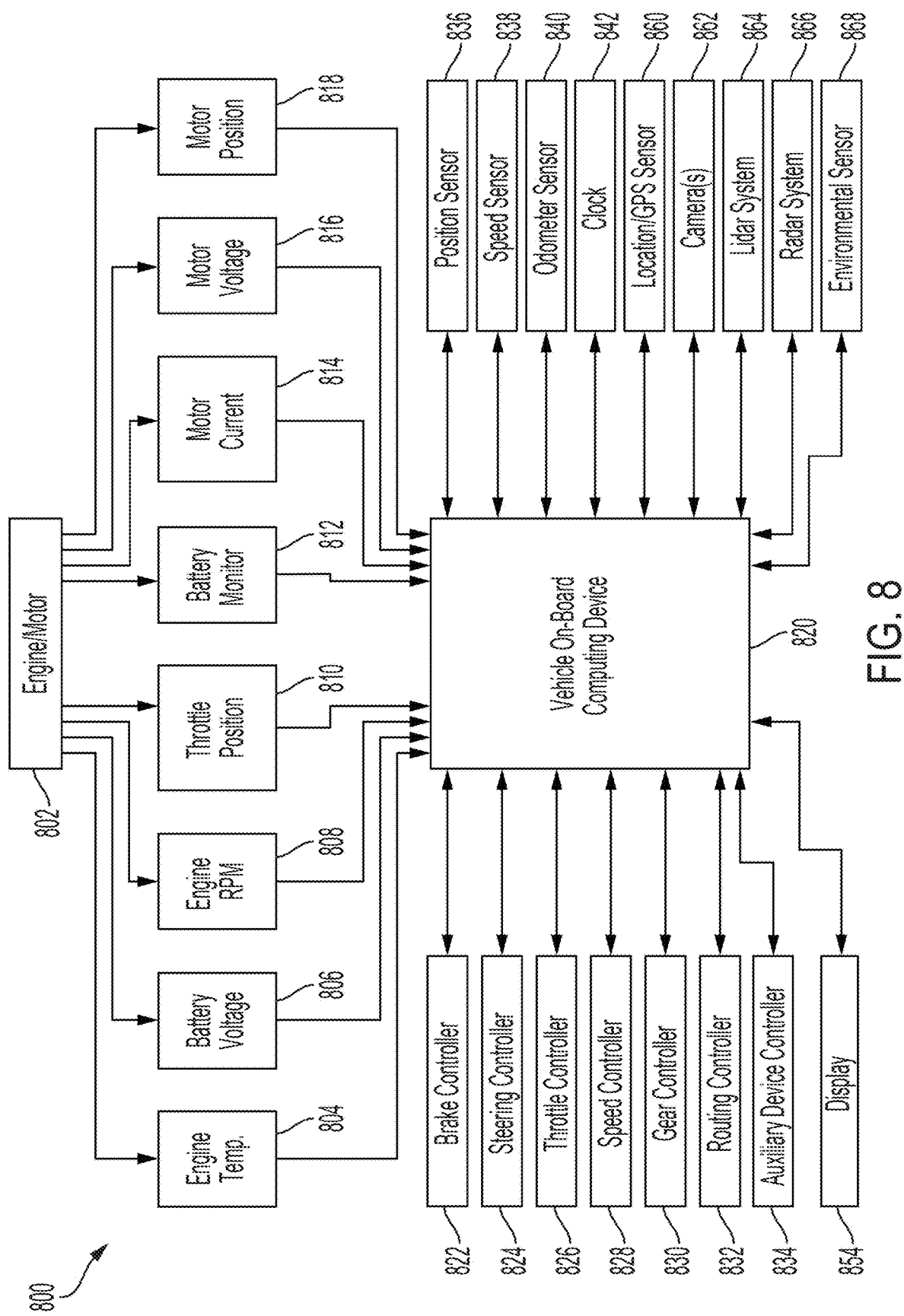
FIG. 8 illustrates an example architecture for a vehicle, in accordance with aspects of the disclosure.

The sensor system 118 may include one or more sensors that are coupled to and/or are included within the AV 102, as illustrated in FIG. 8. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface.

The AV 102 may also communicate sensor data collected by the sensor system to a remote computing device 110 (for example, a cloud processing system) over communications network 108. Remote computing device 110 may be configured with one or more servers to process one or more processes of the technology described in this document. Remote computing device 110 may also be configured to communicate data/instructions to/from AV 102 over network 108, to/from server(s) and/or database(s) 112.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from database 112. Database 112 may be configured to store and supply raw data, indexed data, structured data, map data, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, that of a mobile network (such as 3G, 4G, 5G or the like), etc. The user interface system 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

Figure 2:
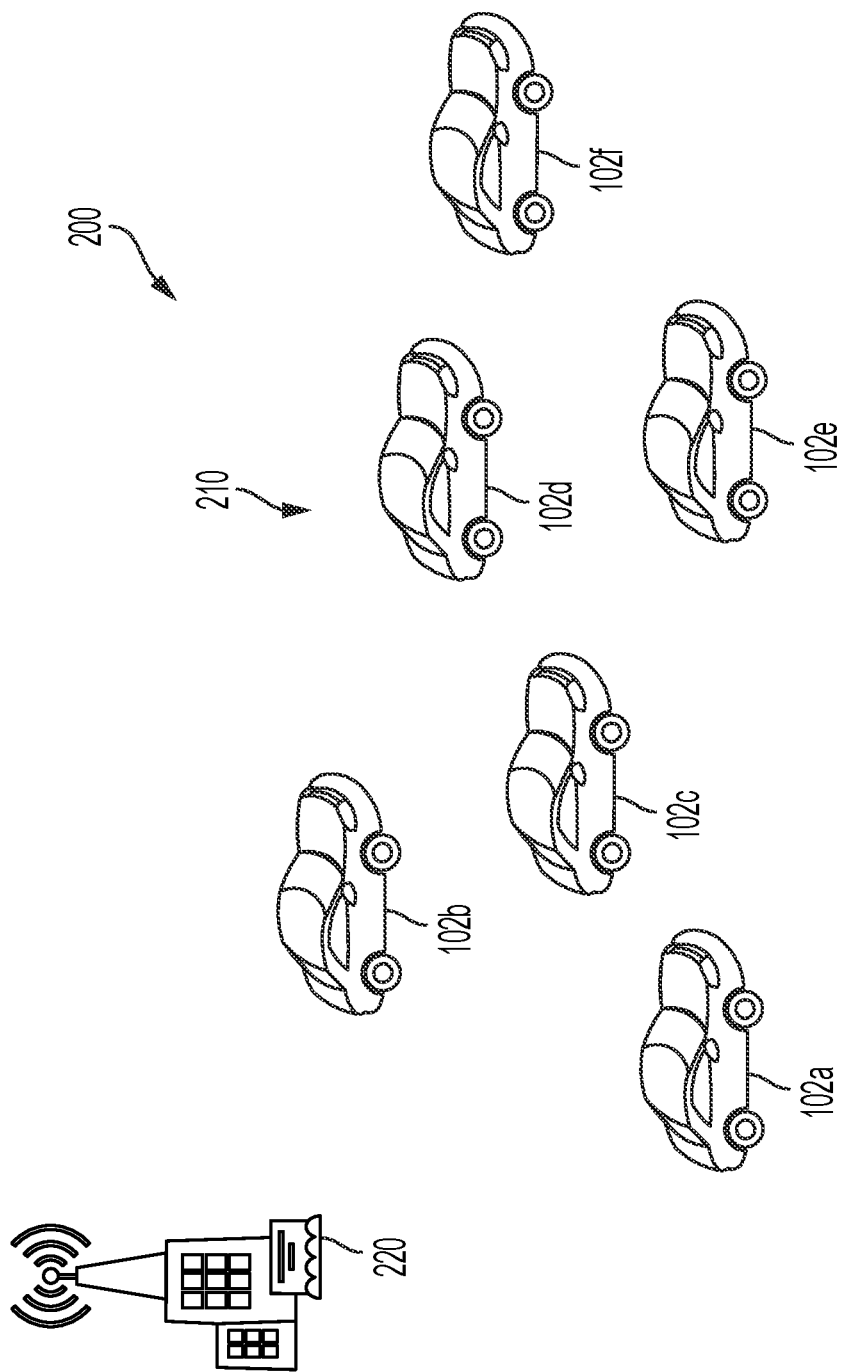
FIG. 2 illustrates an example environment for managing a fleet of AVs.

FIG. 2 illustrates an example environment 200 for managing a fleet 210 of AVs 102, 102a-f. The fleet 210 may include automobiles, robotic vehicles, aerial drones, or other vehicle capable autonomous or semiautonomous operations and which can be remotely monitored. The fleet 210 may include AVs 102 configured as taxis transporting passengers, delivery vehicles transporting goods, vehicles performing testing, training, and/or mapping, etc. In some examples, the AVs 102 include human operators who are prepared to assume control of the vehicle 102 when necessary. These human operators may require general training and/or mission-specific training or qualification to perform their roles. In some examples, fleet manager(s) and/or operators control and monitor the AVs 102 from a remote base of operations 220. In this case, the remote operators may be prepared to assume control of the AV 102 if necessary. The base of operations may include one or more fleet managers (also known as test managers) who are responsible for efficient operation of the fleet 210, including scheduling AV missions to make efficient use of available AV resources while adhering to service-level agreements (e.g., as described above). Scheduling AV missions may include receiving a list of requested missions, assigning priorities (e.g., from a predefined set of priorities associated with each mission type) to the requested missions, matching the prioritized mission list to available resources (e.g., mission-ready AVs, qualified operators or other staff, available software versions, mapping data, etc.), assigning missions to individual AVs, commanding the AVs to perform their assigned missions, and monitoring AV performance during mission execution.

Fleet management may be performed according to discrete, scheduled periods of time, e.g., for the convenience of operators and/or fleet managers, including those human operators who ride in AVs 102 (e.g., to assume control if needed). For example, a day may include a morning shift and an afternoon shift with potentially different personnel performing management and/or operator roles during each shift. In some examples, the entire fleet 210 returns to the base of operations 220 at the end of each shift. The fleet 210 may have an associated set of missions to perform during each scheduled period of time (e.g., shift). Fleet management may include preparing the fleet, e.g., making the fleet 210 ready in advance for each shift's missions. Preparing the fleet 210 may include downloading particular software versions and/or configurations to particular AVs 102, and/or providing map information, e.g., indicating the lanes on which the AV 102 may operate while performing its assigned mission. For example, the map information may specify a restricted geographical area in which to provide ride-sharing services, or even a particular set of streets within the restricted geographical area.

The missions may include customer-facing missions, such as transporting passengers or goods for hire. The missions may also include development-related missions (e.g., for the benefit of the fleet operator), such as performing mapping, software or hardware (e.g., sensor) testing, and/or training activities. The missions may be short in duration, such that several missions may be performed during a shift, or the missions may occupy the duration of the shift, such as testing new software. Short-duration missions may have an associated estimated duration of time to perform. For example, a mission to transport a passenger or deliver goods to a requested destination may include an estimated duration based on pickup and drop-off points and knowledge of the route and likely traffic conditions between those points. After dispatching the fleet 210, fleet managers may continually monitor fleet performance (e.g., execution of missions during a shift) to collect data that can be used to refine scheduling algorithms.

Figure 3A:
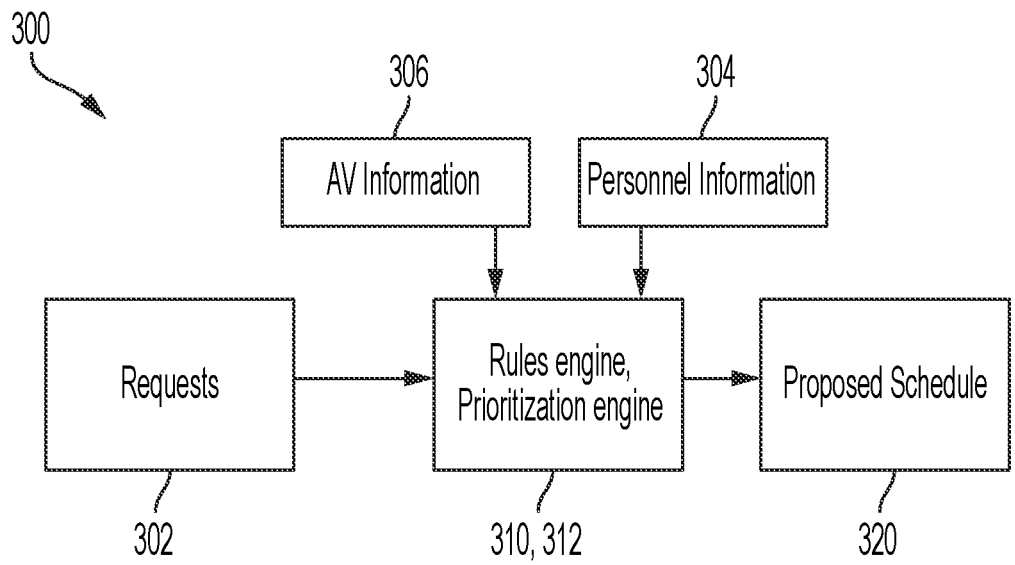
FIGS. 3A and 3B show a flowchart for fleet operation software.
Figure 3B:
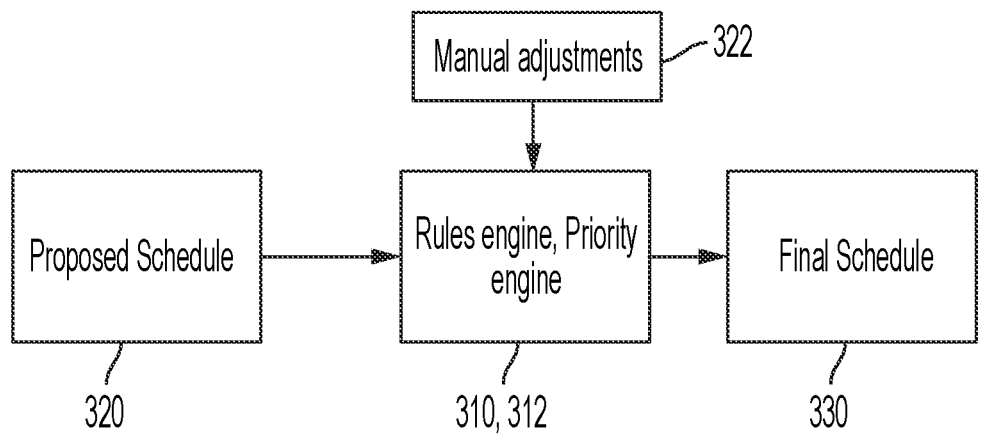

FIGS. 3A and 3B show a flowchart 300 for fleet operation software. The fleet operation software may receive requests 302, e.g., from partners or other mission requesters, for a mission to be performed. To efficiently schedule requested missions 302, the fleet operation software may consider information related to the availability of trained/qualified human operators 304, availability and capabilities of each vehicle 306, and the like. For example, some AVs 102 in the fleet 210 may have mission-specific configurations, such as particular sensor packages. Some AVs 102 may be dedicated to performing missions for specific partners of the fleet operator, e.g., based on a service-level agreement (SLA). AVs 102 may go into and out of service, e.g., for scheduled (or unscheduled) maintenance. Other than availability due to unscheduled maintenance, vehicle capability/availability data is relatively static (compared, e.g., to receiving mission requests 302). However, fleet managers may need to update vehicle information (including vehicle capabilities) as AVs 102 are added to (or permanently removed from) the fleet 210, and/or as AVs 102 are upgraded or reconfigured. The fleet operation software may provide an interface for added/removing AVs 102 and maintaining information related to AV 102 availability and/or capability. Alternatively, the fleet operation software may access an AV-specific authority or data repository, such as vehicle maintenance records, to obtain some or all of this information 306, e.g., to provide consistency between fleet scheduling systems and AV 102 maintenance systems. Similarly, the operation software may provide an interface for adding/removing personnel information 304 related to support staff, staff availability, and qualifications. For example, such personnel information 304 may include training records, qualification status, availability (e.g., scheduled time off), etc. Alternatively or additionally, the fleet operation software may access some or all of such information from a central authority, such as a Human Resources (HR) database.

FIG. 4 depicts a screenshot of an example mission request form 400. The form 400 may be implemented in the form of a user interface such as a screen with fillable fields that prompt requesters to provide salient information related to the mission request 302 before the request 302 will be accepted. For example, requesters may input, and the system may receive, their identity, the type of mission requested, the number of vehicles requested for the mission, the model of vehicle requested (or even a specific vehicle identifier), requested mission time(s) and date(s), including repeating or ongoing mission(s), and (optionally) specific support personnel, etc. Types of missions may include pilot engagement missions, demonstration missions, mapping missions, labeling missions, testing and/or calibration missions, training missions, etc., each of which has an associated set of requirements for test vehicles and support personnel. Pilot engagement missions may include testing new types of missions and/or missions for new partners. Demonstration missions may include missions that highlight capabilities of the fleet operator (e.g., to potential new partners). Testing and calibration missions may seek to improve capabilities of the fleet through improved software, hardware (e.g., sensors), and/or AV configurations. Training missions may be required to maintain staff qualifications. The resource-request form 400 may accept additional input, e.g., including the preferred release of software, and/or particular map requirements for performing the mission (or missions, e.g., when a vehicle 102 is scheduled to perform multiple missions during a shift). This additional information may be used by the system to make the vehicle 102 ready for the requested mission(s), e.g., by downloading the appropriate software and/or mapping data to the vehicle 102 prior to the mission(s).

The fleet operation software may include requester-specific templates, e.g., for common requests, to facilitate requester submissions. That is, the operation software may include a selectable menu of predefined request templates for specific requesters, specific mission types, or other criteria. The templates may include default values for some fields, such as a particular vehicle configuration and mission type. When a requester selects a template, the operation software will auto-populate fields of the resource-request form 400 using the default values. In some examples, the operation software includes an interface for adding, removing, editing, or otherwise maintaining templates. These templates may be particularly useful for, e.g., commercial partners with well-defined mission scope, and only minor variations between requests, e.g., only varying the number of vehicles requested for a particular shift. In some examples, templates are automatically generated, e.g., in response to previously submitted request 302 or other history or course of conduct by a requester. For example, one or more auto-generated templates may include frequently used values associated with previous requests 302.

Referring back to FIG. 3A, the fleet operation software may apply one or more prioritization engines 312 and/or rules engines 310 to the request 302. These engines include set of rules that the operation software applies to mission requests 302. In some examples, the rules are maintained and adjusted, as needed, by fleet managers. The prioritization engine 312 may include rules for assigning a priority to a request 302. The rules may assign priority to requests 302 based on the type of mission requested, contractual obligations associated with the request 302, or other information. For example, the rules may assign a priority based on the mission type according to a predefined list of mission types and associated priorities. An example prioritization list based on the type of mission may include, e.g., (in order of highest priority to lowest priority): pilot missions, demonstration missions, mapping, missions, vehicle testing, and personnel training. As in the case of other rules (described in more detail below), the fleet management software may include an interface allowing fleet managers to update the prioritization list, e.g., as new mission types emerge or as contractual obligations necessitate adjusting priorities, or for any other reason. The prioritization engine 312 may also assign a high priority to a mission that was requested as "urgent," regardless of mission type (e.g., when the requester checks a box labeled "urgent" on the interface).

The rules engine 310 may include rules for assigning resources to each request 302. Resources that are generally required for a mission include mission-ready and appropriately configured AVs 102 and available and appropriately trained and qualified personnel. The rules may specify, e.g., for each mission type: the number and qualifications of personnel or the model and/or configuration of an AV 102. In some examples, the rules engine 310 matches resources to requests 302 in priority order. The rules may cause the operation software to reject requests 302 when appropriate resources are unavailable (or to flag such requests 302 for later review). The rules engine 310 may also include rules that apply thresholds to each request 302. For example, rules may limit the number of AVs 102 that can be assigned to a type of mission. Rules may also limit the missions based on the level or types of required support personnel in the AV 102 and/or in the base of operations 220, e.g., limiting the number of test/development missions based on a threshold number of available test engineers. In some examples, the rules cause the fleet operation software to reject requests 302 that exceed thresholds. Alternatively, the rules may cause the fleet operation software to flag such requests 302 for further review at a later point in the scheduling processes. The fleet operation software may provide an interface allowing fleet managers to adjust the thresholds (and related rules, such as whether to reject nonconforming requests 302 or flag such requests 302 for later review).

The rules may also be configured to address or enforce contractual obligations, e.g., as defined by service-level agreements with business partners. Contractual obligations may specify, e.g., a minimum number of AVs 102 per shift, or a minimum number of missions per shift, etc. In some examples, rules that are based on contractual obligations are applied to requests 302 before other rules, e.g., to improve adherence to important agreements. For example, the fleet manager may configure the order of rule application, e.g. by adjusting the order of rules applied by the rules engine 310, so that rules associated with contractual obligations are applied before other rules. In one example, a first rule may assign a minimum number of vehicles 102 to a ride-sharing mission in order to satisfy an obligation under an agreement with a commercial ride-sharing partner. After the first rule assigns the minimum number of vehicles 102, subsequent rules may assign additional missions to the remaining vehicles 102.

The rules may also specify whether or not an AV 102 may be shared between requesters during a shift (e.g., due to data privacy concerns). Rules may also include preferences or "soft" rules. That is, the fleet manager may configure one or more rules to be honored if possible, but may be ignored if circumstances prevent the "soft" rule from being followed. For example, a "soft" rule may include a preference for a particular model of AV 102. If the model is available for a scheduled mission, then the fleet operation software will apply the rule. However, if the particular model of AV 102 specified by the "soft" rule is not available, the fleet operation software may assign the mission to the non-conforming AV 102. In contrast, if a "hard" rule specified a particular model of AV 102 that was not available, the fleet operation software would not assign the mission to the non-conforming AV 102. "Soft rules" may cause the fleet operation software to provide an indication, such as an alert, to indicate whether the schedule violates one or more "soft" rules. The fleet operation software may provide an interface allowing fleet managers to adjust the rules and priorities that drive the prioritization engines 312 and/or rules engines 310, respectively, e.g., based on changing contractual obligations and/or empirical evidence of fleet effectiveness. The interface may allow changing rules between "hard" and "soft" rules, e.g., by checking a box on a visual interface.

In some examples, the fleet operation software may update mission schedules on an ongoing basis. That is, the fleet operation software may revise the schedule each time a new request 302 is submitted. The fleet operation software may also monitor other sources of information, such as personnel time-off schedules and/or AV 102 maintenance schedules, and revise the schedule based on changes to resource availability. Alternatively or additionally, the fleet operation software may automatically schedule missions at a fixed time before the start of a shift, and/or the fleet manager may manually initiate the scheduling operation at any time. When the fleet operation software schedules missions at a fixed time before the start of a shift, the fixed time may allow opportunity for making the fleet 210 ready prior to the start of the shift. As shown in FIG. 3A, the fleet operation software may produce a proposed schedule 320 (described in more detail below with respect to FIG. 5A). The proposed schedule 320 may include indications of conflicts, underutilized resources, and/or violations of "soft" rules.

Conflicts include the situation where a resource is assigned (or tentatively assigned) to multiple missions that are scheduled for the same time and which conflict cannot otherwise be resolved by the rules of the rules engine 310. For example, the same operator or the same vehicle 102 may be scheduled for two simultaneous missions, both of which have the same priority. Without an additional rule favoring one assignment over the next (e.g., first-come, first-served), the fleet operation software may be unable to equitably resolve the conflict. In this case, manual intervention may be required to resolve the immediate conflict. Avoiding the conflict in the future may require an adjustment to the rules of the rules engine 310. Conflicts may also occur when vehicles are scheduled for more than one mission within a shift and the missions have conflicting or incompatible requirements. For example, a conflict may arise if a vehicle is scheduled for missions requiring incompatible software versions and/or mapping data, and the vehicle is incapable of storing all required software versions and/or mapping data during the shift (e.g., due to limited memory). In the latter case, the conflict may be manually resolved by overriding one or more conflicting resource requirements, e.g., if such an override does not compromise the missions.

Underutilized resources include AVs 102 and/or personnel that are not assigned to (or associated with) a scheduled mission during a time slot. Underutilization may be caused by a relatively small number of mission requests 302 (e.g., compared to available AVs/personnel), or may be caused by a strong demand for, e.g., a particular AV configuration and/or personnel having particular qualifications. In some cases, underutilized can be ameliorated by temporarily adjusting mission priorities or relaxing rules that require particular AV configurations and/or particular personnel qualifications.

Violations of "soft" rules includes the situation where circumstances prevented the operation software from honoring the "soft" rule. For example, A "soft" rule may specify a preferred AV configuration for a particular mission type. If the preferred AV configuration is unavailable, the fleet operation software may schedule an alternative AV configuration for the mission but flag the assignment as a violation of a "soft" rule.

To address this and other issues, the fleet operation software may provide an interface by which a fleet manager may enter, and the system may receive, manual adjustments 322 to the proposed schedule 320. Adjustments 322 may include, e.g., updating one or more AV 102 or personnel assignments associated with one or more missions, canceling a mission, manually adding one or more unrequested missions, etc. The fleet operation software may maintain a log or record of manual adjustments 322 for auditing or other purposes, e.g., including the rationale for the adjustment 322.

After the system applies any manual adjustments 322, the fleet operation software may reapply the rules engine 310 and/or prioritization engine 312 to the adjusted schedule to detect newly arising conflicts, underutilized resources, violations of "soft" rules, and so forth. For example, the fleet operation software may treat the manual adjustments as rules that are applied to mission requests 302 prior to, or at a higher priority than, other rules. The fleet operation software may then apply the rules of the rules engine 310 and/or prioritization engine 312 to any remaining unscheduled mission requests. In that way, the manual adjustments act as constraints for subsequently applied rules. Other algorithms are also within the scope of this disclosure, including merely accepting the adjusted scheduled, e.g., unless a conflict (e.g., double-booked AV 102 or personnel) is discovered by the rules. The fleet operation software may reapply the rules of the rules engine 310 and/or prioritization engine 312 to the adjusted schedule after each manual adjustment 322, or only after the fleet manager indicates that all manual adjustments 322 are complete. After reapplying the rules engine 310 and/or prioritization engine 312, the system may produce a final schedule 330. The fleet manager may choose to accept the final schedule 330 or apply additional manual adjustments 322 and iterate until the fleet operation software produces an acceptable final schedule 330.

Figure 5A:
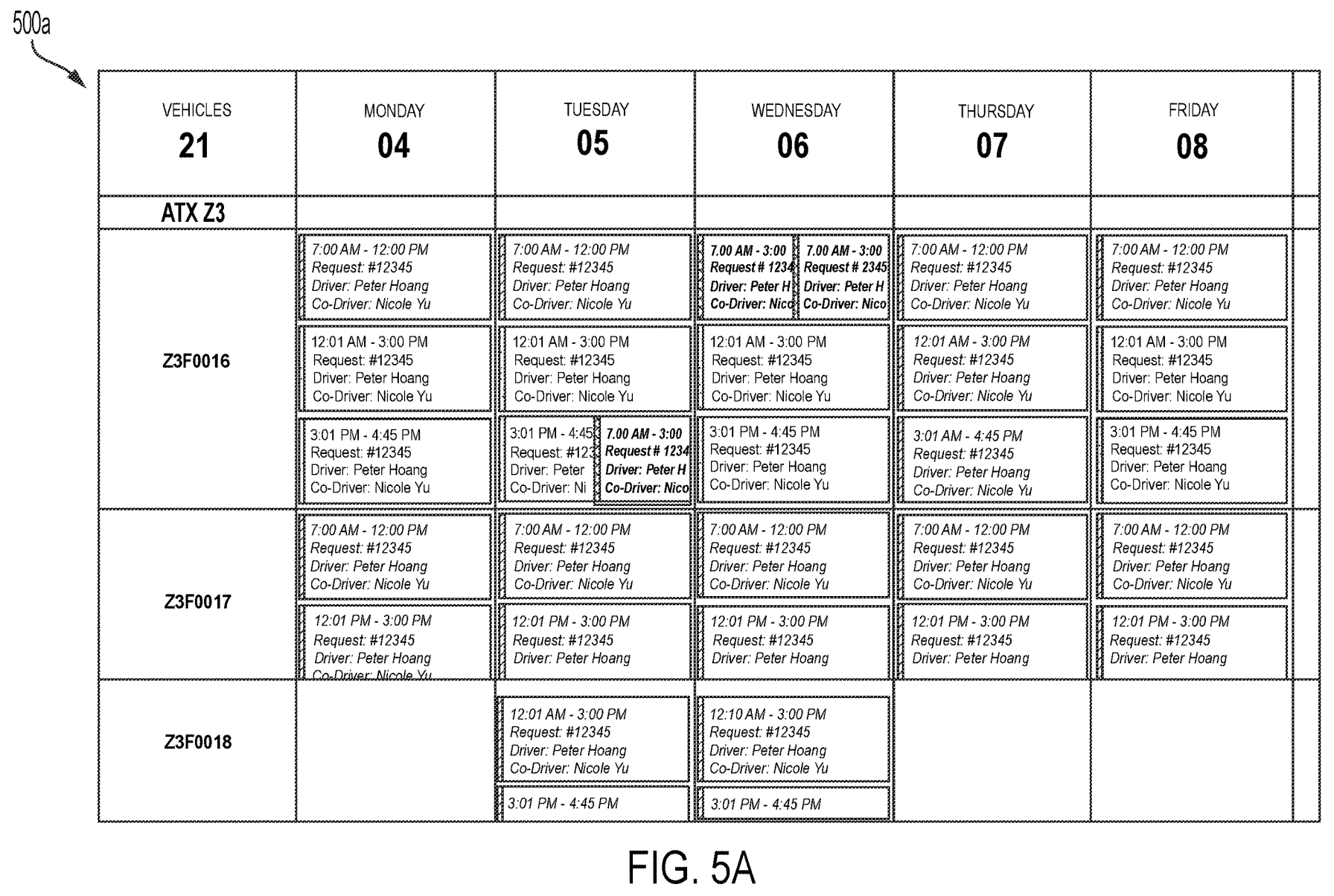

FIG. 5A depicts a screenshot 500a of an example proposed schedule 320 produced by the fleet operation software. As shown, the proposed schedule 320 displays mission assignments for a work week, e.g. Monday through Friday. Here, the proposed schedule 320 is displayed as a vertical list of AVs 102 grouped by AV model. The schedule shows the mission assignments for two ATX Z3 model AVs 102. The rightmost column of the schedule indicates the particular AV 102, e.g. by AV identification number. The AV's schedule for each day of the work week is displayed in columns under the corresponding day of the week. As described above, each day may include one or more shifts. Furthermore, each shift may include one or more assigned missions. Here, each workday includes three shifts, one from 7:00 AM till 12:00 PM, one from 12:01 PM till 3:00 PM, and one from 3:01 PM till 4:45 PM.

As shown, the proposed schedule 320 includes three conflicts. As described above, a vehicle 102 or personnel (e.g., operator, test specialist, etc.) may be scheduled for multiple simultaneous missions (e.g., double-booked or over-booked). In some examples, rules applied by the priority engine (or other rules) may resolve the conflict, e.g., by assigning the overbooked resource to the higher priority mission. In other cases, the rules may be unable to resolve the conflict, e.g., if the conflicted missions have equal priorities. The system may recognize that a resource is over-booked (e.g., assigned to multiple simultaneous missions), and may flag the missions that include the conflict (e.g., the simultaneously scheduled missions that include the over-booked resource) for manual resolution. Conflicts may also include circumstances where multiple missions with incompatible resources are assigned to one vehicle 102 during a shift. The fleet operation software may indicate the conflicts by color-coding schedule entries, and/or by displaying a list of conflicts to review and resolve. Conflicts may arise for a number of reasons, including overly restrictive rules applied by the rules engine 310. In some cases, the fleet manage may modify such rules to be "soft" rules to avoid future conflicts (e.g., by relaxing the required software version and/or mapping data requirements). The proposed schedule 320 may also include unallocated or underutilized resources. For example, a vehicle 102 may only be scheduled for one of three available shifts. Underutilized resources may also arise for a number of reasons, also including overly restrictive rules applied by the rules engine 310. The fleet operation software may indicate resource underutilization by showing a gap or blank area for the vehicle's unassigned shift. As in the case of conflicts, the fleet operation software also may display a list of underutilized resources to review and resolve (or accept). FIG. 5B depicts a screenshot 500b of a final schedule 330 produced by the fleet operation software, i.e., a schedule that does not have any unresolved conflicts or unaccepted underutilizations. As shown, the final schedule 330 displays final mission assignments for the work week. Once the schedule is finalized, the fleet operation software may publish (or otherwise make available) the final schedule 330 to stakeholders, such as mission requesters, vehicle operators, fleet service/maintenance entities, etc. For example, the fleet operation software may provide calendar updates to drivers indicating their scheduled missions.

As described above, the rules assign mission-ready and appropriately configured AVs 102 and available and appropriately trained and qualified personnel to each mission. In some examples, the rules also assigned appropriately configured versions of software and/or mapping data to be used during the mission, e.g., indicating the lanes on which the AV 102 may operate while performing its assigned mission. After the schedule is finalized, the fleet operation software may also generate (or initiate the process of generating) the required software versions and configurations and/or map information or otherwise prepare the fleet 210 for the next shift of the final schedule 330. As described above, the mission request 302 may indicate a preferred release of software and/or particular map requirements for performing the mission (or may have this information auto-populated from a template). Rules that are applied by the rules engine 310 may also indicate a preferred release of software and/or particular map requirements. For example, rules may indicate particular software versions and/or particular mapping data for particular mission types. The system may associate software version and/or mapping data information with scheduled missions.

Because software and/or mapping data may be as large as 80-100 Gigabytes in size, it may be unwieldy or impossible for a vehicle 102 to simultaneously store multiple copies of each. Therefore, an AV 102 may be configured with a single version of software and/or mapping data throughout a shift. If particular software and/or mapping data is associated with a scheduled mission, the system may use this information to make the vehicle 102 ready for the requested mission, e.g., by downloading the appropriate software and/or mapping data to the vehicle 102 prior to the mission. For example, after generating required software versions or mapping data, the fleet operation software may produce a manifest of the required software versions and/or map information for each scheduled AV 102. The fleet operation software may also download the software or map information to corresponding AVs 102 prior to the start of the shift (e.g., via a network interface to the AV 102), and the fleet operation software may perform on-board diagnostic tests or validation tests to ensure that the AV 102 is otherwise properly configured to perform its assigned missions.

FIG. 6A depicts a screenshot 600a of an example personnel (e.g., driver) management interface. As described above, the rules engine 310 considers available, qualified personnel when scheduling missions. The personnel management interface lists personnel and associated information, e.g.

from a database maintained by the fleet operation software or by a central authority, such as a Human Resources (HR) database. The associated personnel information 304 may include which fleet the person is associated with, e.g., if the fleet operator operates more than one fleet. As shown, the fleet operator operates fleets at several different geographic areas. Each person is associated with one or more of the geographic area's fleets. The associated personnel information 304 may also include a driver type or a non-driver type, such as an equipment specialist who accompanies a driver during a mission. In the case of a driver, the associated personnel information 304 may also include driver certification and/or qualifications. In some cases, certifications and/or qualifications expire after a period of time. The personnel management interface may display the time remaining for each certification and/or qualification, and/or may color-code entries to indicate how much time remains in the certification or qualification before it must be renewed. In some examples, the fleet operation software automatically generates a request 302 for a training mission for the person when the remaining time before recertification/requalification is required becomes less than a threshold. Similarly, the fleet operation software may automatically update certifications and qualifications after training missions are performed.

FIG. 6B depicts another screenshot 600b of the example personnel management interface. Here, the interface shows approved time-off requests for a week. In some examples, the personnel management interface also allows people to submit requests for time off, and allows fleet managers to approve or deny the submitted requests 302. The interface may include other features, such as filtering the displayed information, e.g., by person, availability, certifications, etc. and/or displaying information for time periods other than one week.

FIG. 7 depicts a screenshot 700 of a vehicle management interface. As described above, the rules engine 310 considers available vehicles when scheduling missions. The vehicle management interface lists vehicle and associated vehicle information, e.g., from a database maintained by the fleet operation software or by a central authority, such as a vehicle maintenance log or database. The associated vehicle information may include the fleet with which the vehicle is associated, e.g., if the fleet operator operates more than one fleet. As shown, the fleet operator operates fleets at several different metropolitan areas. Each vehicle is associated with one of the geographic areas" fleets. Here, the interface shows the current service status and state of vehicle eligibility to perform particular types of missions. For example, food delivery missions may require an AV 102 that is configured with specialized equipment for keeping the meals hot (or cold). When scheduling missions, the rules engine 310 may considers only those vehicles that are both available (e.g., vehicles having a good service status that are not already scheduled) and vehicles that are eligible for the type of mission requested. As in the case of the driver management interface, the vehicle management interface may allow filtering the displayed information, e.g., by metropolitan area, vehicle type, mission eligibility, etc.

As described above, the fleet operation software may maintain a log or record of manual adjustments 322 to the schedule for auditing or other purposes. The fleet operation software may use this information to track efficacy of the rules engine 310 (e.g., how often manual adjustments 322 were required) and provide an auditable record of the reasons for the adjustments 322. The fleet operation software may also track how often schedules include conflicts or underutilized resources. The fleet operation software may even record the amount of time the fleet manager is engaged with the fleet operation software at various stages of the process, e.g., addressing conflicts or underutilized resources, or manually updating the proposed schedule 320 (or the final schedule 330) for other reasons. Using this information, fleet managers may refine and updates the rules used by the rules engine 310 to reduce the rate of manual adjustment or adjust the size or staffing of one or more fleets and/or reallocate staff or vehicles from one fleet to another.

The fleet operation software may track and/or other metrics as well. For example, the fleet operation software may produce reports quarterly, annually, or at any other regular or irregular interval. The report may include, e.g., the rate at which missions could not be scheduled due to unavailability of a eligible vehicle, or due to the unavailability of qualified personnel. The reports may further break down this information by mission type, geographical region, and/or other salient characteristic. The report may also include how often a final schedule 330 was overridden, e.g., because a vehicle 102 became unavailable (e.g., due to breakdown) at the last minute, or personnel became unavailable (e.g., due to sickness), or because a new, urgent request was submitted after the final schedule 330 was produced. By recording this data over time, the fleet operation software may detect trends over time, and may be used to better staff the different geographical regions, and better allocate and equip AVs 102 and personnel.

Table 1 below lists examples of data that may be tracked by the fleet operation software and included in a report, e.g., as described above.

TABLE 1

| Metric Name | Description | Comments |
| --- | --- | --- |
| Mission Unfulfilled<br>Personnel unavailable<br>AV unavailable | Mission request could not be scheduled. | Broken down by mission type |
| Mission Edited<br>Resource unavailable<br>Conflict resolved<br>Added new request<br>Adjusted priority | Proposed schedule was edited manually by the fleet manager. | Number of mission appointments edited |
| Performance/operating hours by AV | How many hours the AV was in mission, auto/manual, or not operating due to different reasons (AV or external). | |
| Algorithm Performance | How many algorithmically scheduled appointments are modified manually. | |

TABLE 1-continued

| Metric Name | Description | Comments |
|---|---|---|
| | How many conflicts are generated. What percentage of requests are fulfilled. How much time the fleet operator spent using the scheduling tool. | |
| Operator efficiency | What % of time is a certain resource not utilized (AV or person). | |

FIG. 8 illustrates an example system architecture 800 for a vehicle, in accordance with aspects of the disclosure. Vehicles 102 and/or 113 of FIG. 1 can have the same or similar system architecture as that shown in FIG. 8. Thus, the following discussion of system architecture 800 is sufficient for understanding vehicle(s) 102, 103 of FIG. 1. However, other types of vehicles are considered within the scope of the technology described in this document and may contain more or less elements as described in association with FIG. 8. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 8, system architecture 800 for a vehicle includes an engine or motor 802 and various sensors 804-818 for measuring various parameters of the vehicle. In gas-powered or hybrid vehicles having a fuel-powered engine, the sensors may include, for example, an engine temperature sensor 804, a battery voltage sensor 806, an engine revolutions per minute ("RPM") sensor 808, and a throttle position sensor 810. If the vehicle is an electric or hybrid vehicle, then the vehicle may have an electric motor, and accordingly includes sensors such as a battery monitoring system 812 (to measure current, voltage and/or temperature of the battery), motor current 814 and voltage 816 sensors, and motor position sensors 818 such as resolvers and encoders.

Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 860 (such as a Global Positioning System ("GPS") device); object detection sensors such as one or more cameras 862; a lidar system 864; and/or a radar and/or a sonar system 866. The sensors also may include environmental sensors 868 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 820. The on-board computing device 820 may be implemented using the computer system of FIG. 9. The vehicle on-board computing device 820 analyzes the data captured by the sensors and optionally controls operations of the vehicle based on results of the analysis. For example, the vehicle on-board computing device 820 may control: braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers. Auxiliary device controller 834 may be configured to control one or more auxiliary devices, such as testing systems, auxiliary sensors, mobile devices transported by the vehicle, etc.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the cameras 862 and/or object detection information captured from sensors such as lidar system 864 is communicated from those sensors) to the on-board computing device 820. The object detection information and/or captured images are processed by the on-board computing device 820 to detect objects in proximity to the vehicle. Any known or to be known technique for making an object detection based on sensor data and/or captured images can be used in the embodiments disclosed in this document.

Lidar information is communicated from lidar system 864 to the on-board computing device 820. Additionally, captured images are communicated from the camera(s) 862 to the vehicle on-board computing device 820. The lidar information and/or captured images are processed by the vehicle on-board computing device 820 to detect objects in proximity to the vehicle. The manner in which the object detections are made by the vehicle on-board computing device 820 includes such capabilities detailed in this disclosure.

In addition, the system architecture 800 may include an onboard display device 854 that may generate and output an interface on which sensor data, vehicle status information, or outputs generated by the processes described in this document are displayed to an occupant of the vehicle. The display device may include, or a separate device may be, an audio speaker that presents such information in audio format.

The on-board computing device 820 may include and/or may be in communication with a routing controller 832 that generates a navigation route from a start position to a destination position for an autonomous vehicle. The routing controller 832 may access a map data store to identify possible routes and road segments that a vehicle can travel on to get from the start position to the destination position. The routing controller 832 may score the possible routes and identify a preferred route to reach the destination. For example, the routing controller 832 may generate a navigation route that minimizes Euclidean distance traveled or other cost function during the route, and may further access the traffic information and/or estimates that can affect an amount of time it will take to travel on a particular route. Depending on implementation, the routing controller 832 may generate one or more routes using various routing methods, such as Dijkstra's algorithm, Bellman-Ford algorithm, or other algorithms. The routing controller 832 may also use the traffic information to generate a navigation route that reflects expected conditions of the route (e.g., current day of the week or current time of day, etc.), such that a route generated for travel during rush-hour may differ from a route generated for travel late at night. The routing controller 832 may also generate more than one navigation route to a destination and send more than one of these navigation routes to a user for selection by the user from among various possible routes.

In various embodiments, the on-board computing device 820 may determine perception information of the surrounding environment of the vehicle. Based on the sensor data provided by one or more sensors and location information that is obtained, the on-board computing device 820 may determine perception information of the surrounding environment of the vehicle. The perception information may represent what an ordinary driver would perceive in the surrounding environment of a vehicle. The perception data may include information relating to one or more objects in the environment of the vehicle. For example, the on-board computing device 820 may process sensor data (e.g., lidar or radar data, camera images, etc.) in order to identify objects and/or features in the environment of the vehicle. The objects may include traffic signals, roadway boundaries, other vehicles, pedestrians, and/or obstacles, etc. The on-board computing device 820 may use any now or hereafter known object recognition algorithms, video tracking algorithms, and computer vision algorithms (e.g., track objects frame-to-frame iteratively over a number of time periods) to determine the perception.

In some embodiments, the on-board computing device 820 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The on-board computing device 820 may perform one or more prediction and/or forecasting operations. For example, the on-board computing device 820 may predict future locations, trajectories, and/or actions of one or more objects. For example, the on-board computing device 820 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the on-board computing device 820 may predict whether the object will likely move straight forward or make a turn. If the perception data indicates that the intersection has no traffic light, the on-board computing device 820 may also predict whether the vehicle may have to fully stop prior to entering the intersection.

In various embodiments, the on-board computing device 820 may determine a motion plan for the autonomous vehicle. For example, the on-board computing device 820 may determine a motion plan for the autonomous vehicle based on the perception data and/or the prediction data. Specifically, given predictions about the future locations of proximate objects and other perception data, the on-board computing device 820 can determine a motion plan for the AV 102 that best navigates the autonomous vehicle relative to the objects at their future locations.

In some embodiments, the on-board computing device 820 may receive predictions and make a decision regarding how to handle objects and/or actors in the environment of the vehicle. For example, for a particular actor (e.g., a vehicle with a given speed, direction, turning angle, etc.), the on-board computing device 820 decides whether to overtake, yield, stop, and/or pass based on, for example, traffic conditions, map data, state of the autonomous vehicle, etc. Furthermore, the on-board computing device 820 also plans a path for the vehicle to travel on a given route, as well as driving parameters (e.g., distance, speed, and/or turning angle). That is, for a given object, the on-board computing device 820 decides what to do with the object and determines how to do it. For example, for a given object, the on-board computing device 820 may decide to pass the object and may determine whether to pass on the left side or right side of the object (including motion parameters such as speed). The on-board computing device 820 may also assess the risk of a collision between a detected object and the vehicle. If the risk exceeds an acceptable threshold, it may determine whether the collision can be avoided if the autonomous vehicle follows a defined vehicle trajectory and/or implements one or more dynamically generated emergency maneuvers is performed in a time period (e.g., N milliseconds). If the collision can be avoided, then the on-board computing device 820 may execute one or more control instructions to perform a cautious maneuver (e.g., mildly slow down, accelerate, change lane, or swerve). In contrast, if the collision cannot be avoided, then the on-board computing device 820 may execute one or more control instructions for execution of an emergency maneuver (e.g., brake and/or change direction of travel).

As discussed above, planning and control data regarding the movement of the autonomous vehicle is generated for execution. The on-board computing device 820 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 9:
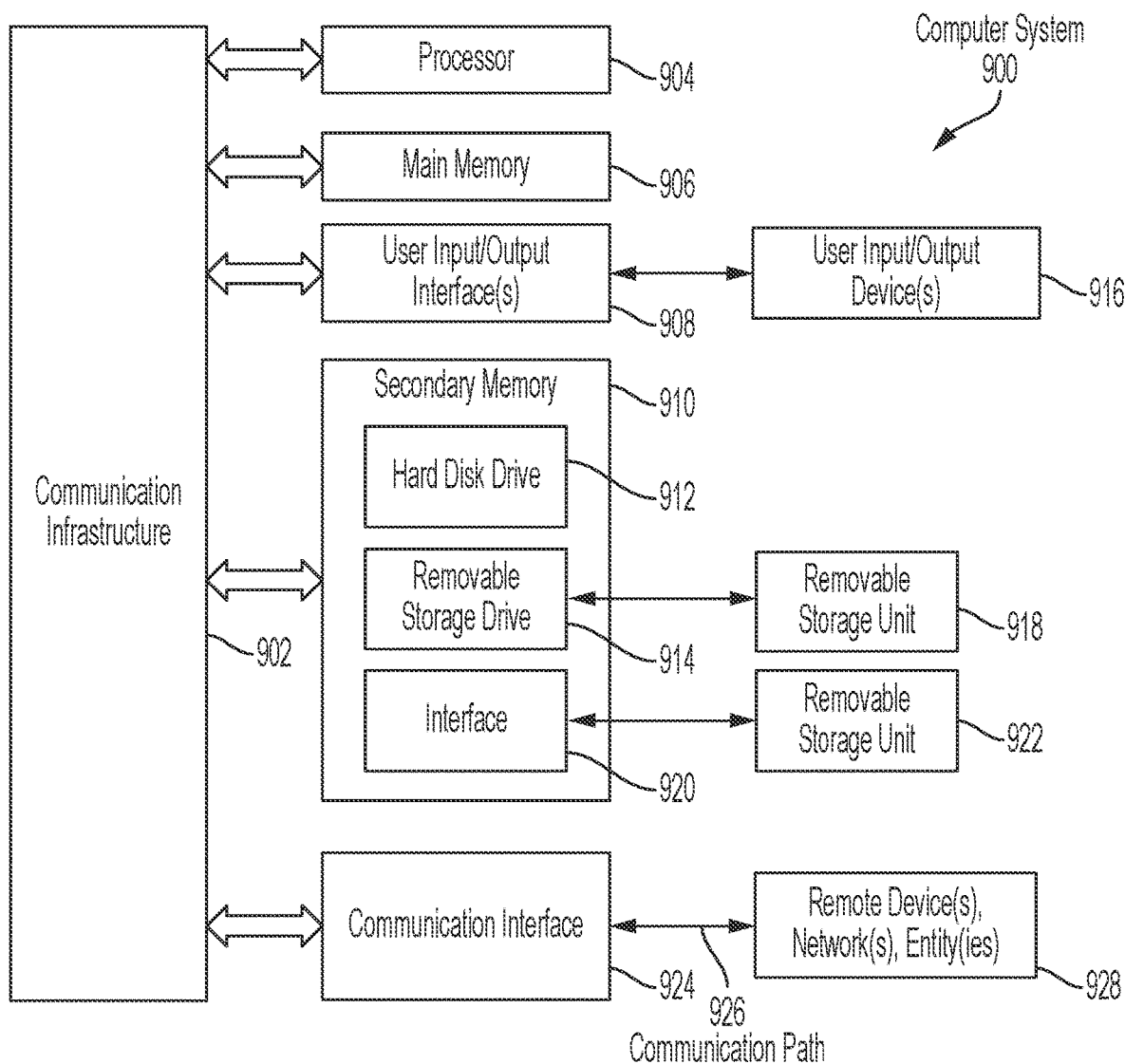
FIG. 9 is an example computer system useful for implementing various embodiments

Various embodiments can be implemented, for example, using one or more computer systems, such as computer system 900 shown in FIG. 9. Computer system 900 can be any computer capable of performing the functions described in this document.

Computer system 900 includes one or more processors (also called central processing units, or CPUs), such as a processor 904. Processor 904 is connected to a communication infrastructure or bus 902. Optionally, one or more of the processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 916, such as monitors, keyboards, pointing devices, etc., that communicate with communication infrastructure 902 through user input/output interface(s) 908.

Computer system 900 also includes a main or primary memory 906, such as random access memory (RAM). Main memory 906 may include one or more levels of cache. Main memory 906 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 914 reads from and/or writes to removable storage unit 918 in a well-known manner.

According to an example embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 900, main memory 906, secondary memory 910, and removable storage units 918 and 922, as well as tangible articles of manufacture embodying any combination of the foregoing. Such control logic, when executed by one or more data processing devices (such as computer system 900), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described in this document.

Figure 10:
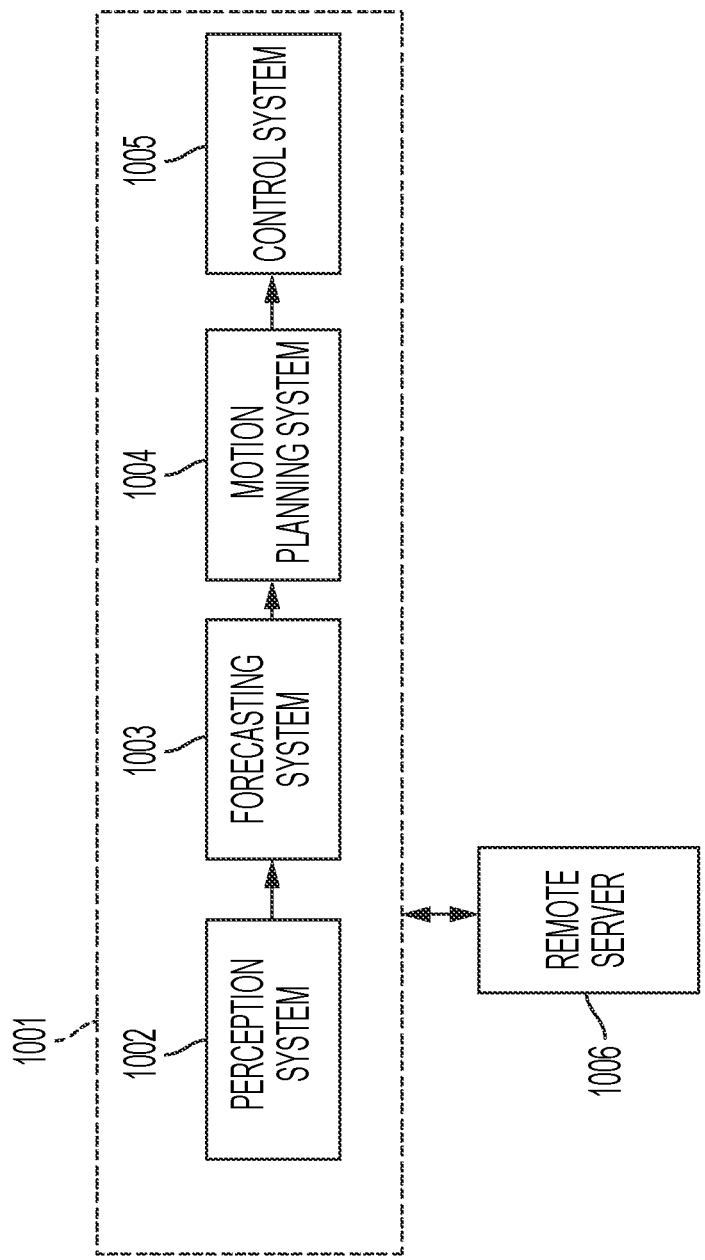
FIG. 10 is a block diagram that illustrates example subsystems of an autonomous vehicle.

FIG. 10 shows a high-level overview of vehicle subsystems that may be relevant to the discussion above. Specific components within such systems were described in the discussion of FIG. 8 in this document. Certain components of the subsystems may be embodied in processor hardware and computer-readable programming instructions that are part of the vehicle on-board computing system 1001.

The subsystems may include a perception system 1002 that includes sensors that capture information about moving actors and other objects that exist in the vehicle's immediate surroundings. Example sensors include cameras, lidar sensors and radar sensors. The data captured by such sensors (such as digital image, lidar point cloud data, or radar data) is known as perception data. The perception data may include data representative of one or more objects in the environment. The perception system may include one or more processors, along with a computer-readable memory with programming instructions and/or trained artificial intelligence models that, during a run of the vehicle, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

If the vehicle is an AV, the vehicle's perception system 1002 may deliver perception data to the vehicle's forecasting system 1003. The forecasting system (which also may be referred to as a prediction system) will include processors and computer-readable programming instructions that are configured to process data received from the perception system and forecast actions of other actors that the perception system detects.

In an AV, the vehicle's perception system, as well as the vehicle's forecasting system, will deliver data and information to the vehicle's motion planning system 1004 and motion control system 1005 so that the receiving systems may assess such data and initiate any number of reactive motions to such data. The motion planning system 1004 and control system 1005 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

In non-AV embodiments, such as with vehicles that are driven by human operators, the motion planning system 1004 may be embodied in processor hardware and computer-readable hardware that are part of an electronic devices that is contained with the vehicle, such as a dashboard navigation system or a mobile electronic device of the operator. In such situations, the electronic device may output the trajectories planned by the motion planning system via a display, an audio speaker, or both. In addition, some parts of the perception system 1002 may include a transceiver of an electronic device that receives certain perception data (such as weather data) from a remote server via wireless communication.

The vehicle's on-board computing system 1001 will be in communication with a remote server 1006. The remote server 1006 is an external electronic device that is in communication with the vehicle's on-board computing system 1001, either via a wireless connection while the vehicle is making a run, or via a wired or wireless connection while the vehicle is parked at a docking facility or service facility. The remote server 1006 may receive data that the vehicle collected during its run, such as perception data and operational data. The remote server 1006 also may transfer data or other information to the vehicle such as software updates, high definition (HD) map updates, machine learning model updates and other information.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

A "run" of a vehicle refers to an act of operating a vehicle and causing the vehicle to move about the real world. A run may occur in public, uncontrolled environments such as city or suburban streets, highways, or open roads. A run may also occur in a controlled environment such as a test track.

The term "execution flow" refers to a sequence of functions that are to be performed in a particular order. A function refers to one or more operational instructions that cause a system to perform one or more actions. In various embodiments, an execution flow may pertain to the operation of an automated device. For example, with respect to an autonomous vehicle, a particular execution flow may be executed by the vehicle in a certain situation such as, for example, when the vehicle is stopped at a red stop light that has just turned green. For instance, this execution flow may include the functions of determining that the light is green, determining whether there are any obstacles in front of or in proximity to the vehicle and, only if the light is green and no obstacles exist, accelerating. When a subsystem of an automated device fails to perform a function in an execution flow, or when it performs a function out of order in sequence, the error may indicate that a fault has occurred or that another issue exists with respect to the execution flow.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The term "wireless communication" refers to communication between two devices in which at least a portion of the communication path includes a signal that is transmitted wirelessly, but it does not necessarily require that the entire communication path be wireless.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

As used in this document, the terms "infer" and "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

The term "divider", when used in the context of a street or road, is any structure or distance that separates two or more lanes of a road. A divider may be, for example, a concrete divider, longitudinal channelizing devices (LCDs), a Jersey barrier, a median strip, central reservation, etc. It should be understood by those of ordinary skill in the art that these are merely examples of dividers and that other types of dividers are further contemplated in accordance with aspects of the present disclosure.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

As described above, this document discloses system, method, and computer program product embodiments for preparing a fleet of autonomous vehicles for service. The system embodiments include preparing a fleet of autonomous vehicles for service. The computer program embodiments include programming instructions, e.g., stored in a memory, to cause a processor to perform the data management methods described in this document. The system embodiments also include a processor which is configured to perform the methods described in this document, e.g., via the programming instructions. More generally, the system embodiments include a system comprising means to perform the steps of the any of the methods described in this document.

In various embodiments, the methods include a method of preparing a fleet of vehicles for service. The method includes receiving data including: a set of mission types, each mission type having an associated priority; a set of mission requests, each mission request having an associated mission type; vehicle information related to vehicles of a fleet, the vehicle information including vehicle capabilities; and personnel information related to one or more personnel, the personnel information including personnel qualifications. The method further includes applying the set of mission types and the set of mission requests to one or more priority engines to produce a prioritized list of mission requests. The method further includes applying the received vehicle information, the received personnel information, and the prioritized list of mission requests to one or more rules engines to produce, based on the personnel qualifications and the vehicle capabilities, a proposed schedule of missions for a period of time, such that each scheduled mission is assigned to a corresponding vehicle of the fleet and corresponding one or more of the personnel. The method further includes generating software and/or map data for one or more of the vehicles based on its assigned mission and providing the generated software and/or map data to the one or more of the vehicles prior to the period of time.

Implementations of the disclosure may include one or more of the following optional features. In some examples, the fleet of vehicles is a fleet of autonomous vehicles; the set of mission types incudes ride-sharing missions, vehicle-testing missions, and personnel-training missions; the priority of the ride-sharing missions is greater than the priority of the vehicle-testing missions; and the priority of the vehicle-testing missions is greater than the priority of the personnel-training missions. In some examples, the vehicle information includes vehicle configuration information and, for at least one mission type, the one or more rules engines are configured to assign missions associated with the at least one mission type based on the vehicle configuration information. The one or more rules engines may be configured to only assign missions associated with the at least one mission type to vehicles having a required vehicle configuration for performing the at least one mission type. The one or more rules engines may be configured to assign missions associated with the at least one mission type based on personnel qualifications to participate in the at least one mission type. In some examples, the set of mission types includes personnel-training missions, the personnel information comprises imminently expiring personnel qualifications, and the one or more rules engines are configured to assign personnel-training missions based on the imminently expiring personnel qualifications. Generating software and/or map data may include generating the software and/or map data based on the mission type of the assigned mission. In some examples, the method further includes displaying the proposed schedule to a user, receiving one or more updates to the proposed schedule from the user, and updating the proposed schedule based on the received updates. In some examples, the method further includes identifying one or more conflicts in the proposed schedule and indicating the identified conflicts on the displayed schedule.

In other embodiments, a system includes a memory and at least one processor coupled to the memory and configured to receive data. The data includes a set of mission types, each mission type having an associated priority; a set of mission requests, each mission request having an associated mission type; vehicle information related to vehicles of a fleet, the vehicle information including vehicle capabilities; and personnel information related to one or more personnel, the personnel information including personnel qualifications. The at least one processor is further configured to apply the set of mission types and the set of mission requests to one or more priority engines to produce a prioritized list of mission requests. The at least one processor is further configured to apply the received vehicle information, the received personnel information, and the prioritized list of mission requests to one or more rules engines to produce, based on the personnel qualifications and the vehicle capabilities, a proposed schedule of missions for a period of time, such that each scheduled mission is assigned to a corresponding vehicle of the fleet and corresponding one or more of the personnel. The at least one processor is further configured to generate software and/or map data for one or more of the vehicles based on its assigned mission and provide the generated software and/or map data to the one or more of the vehicles prior to the period of time.

Implementations of the disclosure may include one or more of the following optional features. In some examples, the fleet of vehicles is a fleet of autonomous vehicles; the set of mission types incudes ride-sharing missions, vehicle-testing missions, and personnel-training missions; the priority of the ride-sharing missions is greater than the priority of the vehicle-testing missions; and the priority of the vehicle-testing missions is greater than the priority of the personnel-training missions. In some examples, the vehicle information includes vehicle configuration information and, for at least one mission type, the one or more rules engines are configured to assign missions associated with the at least one mission type based on the vehicle configuration information. The one or more rules engines may be configured to only assign missions associated with the at least one mission type to vehicles having a required vehicle configuration for performing the at least one mission type. The one or more rules engines may be configured to assign missions associated with the at least one mission type based on personnel qualifications to participate in the at least one mission type. In some examples, the set of mission types includes personnel-training missions, the personnel information comprises imminently expiring personnel qualifications, and the one or more rules engines are configured to assign personnel-training missions based on the imminently expiring personnel qualifications.

In other embodiments, a non-transitory computer-readable medium is disclosed. The non-transitory computer-readable medium stores instructions that, when executed by at least one computing device, will cause the at least one computing device to perform operations. The operations include receiving data including: a set of mission types, each mission type having an associated priority; a set of mission requests, each mission request having an associated mission type; vehicle information related to vehicles of a fleet, the vehicle information including vehicle capabilities; and personnel information related to one or more personnel, the personnel information including personnel qualifications. The operations further include applying the set of mission types and the set of mission requests to one or more priority engines to produce a prioritized list of mission requests. The operations further include applying the received vehicle information, the received personnel information, and the prioritized list of mission requests to one or more rules engines to produce, based on the personnel qualifications and the vehicle capabilities, a proposed schedule of missions for a period of time, such that each scheduled mission is assigned to a corresponding vehicle of the fleet and corresponding one or more of the personnel. The operations further include generating software and/or map data for one or more of the vehicles based on its assigned mission and providing the generated software and/or map data to the one or more of the vehicles prior to the period of time.

Implementations of the disclosure may include one or more of the following optional features. In some examples, the fleet of vehicles is a fleet of autonomous vehicles; the set of mission types incudes ride-sharing missions, vehicle-testing missions, and personnel-training missions; the priority of the ride-sharing missions is greater than the priority of the vehicle-testing missions; and the priority of the vehicle-testing missions is greater than the priority of the personnel-training missions. In some examples, the vehicle information includes vehicle configuration information and, for at least one mission type, the one or more rules engines are configured to assign missions associated with the at least one mission type based on the vehicle configuration information. The one or more rules engines may be configured to only assign missions associated with the at least one mission type to vehicles having a required vehicle configuration for performing the at least one mission type. The one or more rules engines may be configured to assign missions associated with the at least one mission type based on personnel qualifications to participate in the at least one mission type. In some examples, the set of mission types includes personnel-training missions, the personnel information comprises imminently expiring personnel qualifications, and the one or more rules engines are configured to assign personnel-training missions based on the imminently expiring personnel qualifications.

The invention claimed is:

1. A method of preparing a fleet of vehicles for service, comprising:
    receiving data comprising:
        a set of mission types, each mission type having an associated priority;
        a set of mission requests to be performed during an upcoming period of time, each mission request having an associated mission type, the set of mission types comprising ride-sharing missions, vehicle-testing missions, and personnel-training missions, wherein the priority of the ride-sharing missions is greater than the priority of the vehicle-testing missions, and the priority of the vehicle-testing missions is greater than the priority of the personnel-training missions;
        vehicle information related to a plurality of vehicles of a fleet of autonomous vehicles, the vehicle information comprising vehicle capabilities; and
        personnel information related to one or more personnel, the personnel information comprising personnel qualifications;
    applying the set of mission types and the set of mission requests to one or more priority engines to produce a prioritized list of mission requests to be performed during the upcoming period of time;
    applying the received vehicle information, the received personnel information, and the prioritized list of mission requests to one or more rules engines to produce, based on the personnel qualifications, personnel availability during the upcoming period of time, and the vehicle capabilities, a proposed schedule of missions to be performed during the upcoming period of time, such that each scheduled mission is assigned to a corresponding vehicle of the fleet of autonomous vehicles and corresponding one or more of the personnel;
    based on its assigned mission, generating software for performing the assigned mission and/or map data for performing the assigned mission for one or more of the vehicles;

providing the generated software and/or map data to the one or more of the vehicles prior to the upcoming period of time; and operating the one or more of the vehicles according to the generated software and/or map data.

2. The method of claim 1, wherein:

the vehicle information comprises vehicle configuration information; and for at least one mission type, the one or more rules engines are configured to assign missions associated with the at least one mission type based on the vehicle configuration information.

3. The method of claim 2, wherein the one or more rules engines are configured to only assign missions associated with the at least one mission type to vehicles having a required vehicle configuration for performing the at least one mission type.

4. The method of claim 2, wherein the one or more rules engines are configured to assign missions associated with the at least one mission type based on personnel qualifications to participate in the at least one mission type.

5. The method of claim 1, wherein generating software and/or map data comprises generating the software and/or map data based on the mission type of the assigned mission.

6. The method of claim 1, further comprising:

displaying the proposed schedule to a user;

receiving one or more updates to the proposed schedule from the user; and updating the proposed schedule based on the received updates.

7. The method of claim 6, further comprising:

identifying one or more conflicts in the proposed schedule; and indicating the identified conflicts on the displayed schedule.

8. The method of claim 1, further comprising:

for a plurality of mission schedules, identifying vehicles and/or personnel that are not assigned to a mission; and producing a report comprising a rate of unused vehicles and/or unused personnel for the plurality of mission schedules.

9. The method of claim 1, wherein providing the generated software and/or map data to the one or more of the vehicles prior to the upcoming period of time comprises providing the generated software and/or map data to the one or more of the vehicles between periods of time when the fleet of autonomous vehicles is in service.

10. The method of claim 1, wherein providing the generated software and/or map data to the one or more of the vehicles prior to the upcoming period of time comprises providing the generated software to the one or more of the vehicles prior to the upcoming period of time.

11. A system, comprising:

a memory; and at least one processor coupled to the memory and configured to:

receive data comprising:

a set of mission types, each mission type having an associated priority;

a set of mission requests to be performed during an upcoming period of time, each mission request having an associated mission type, the set of mission types comprising ride-sharing missions, vehicle-testing missions, and personnel-training missions, wherein the priority of the ride-sharing missions is greater than the priority of the vehicle-testing missions, and the priority of the vehicle-testing missions is greater than the priority of the personnel-training missions;

vehicle information related to a plurality of vehicles of a fleet of autonomous vehicles, the vehicle information comprising vehicle capabilities; and personnel information related to one or more personnel, the personnel information comprising personnel qualifications;

apply the set of mission types and the set of mission requests to one or more priority engines to produce a prioritized list of mission requests to be performed during the upcoming period of time;

apply the received vehicle information, the received personnel information, and the prioritized list of mission requests to one or more rules engines to produce, based on the personnel qualifications and the vehicle capabilities, a proposed schedule of missions to be performed during the upcoming period of time, such that each scheduled mission is assigned to a corresponding vehicle of the fleet of autonomous vehicles and corresponding one or more of the personnel;

based on its assigned mission, generate software for performing the assigned mission and/or map data for performing the assigned mission for one or more of the vehicles;

provide the generated software and/or map data to the one or more of the vehicles prior to the upcoming period of time; and operate the one or more of the vehicles according to the generated software and/or map data.

12. The system of claim 11, wherein:

the vehicle information comprises vehicle configuration information; and for at least one mission type, the one or more rules engines are configured to assign missions associated with the at least one mission type based on the vehicle configuration information.

13. The system of claim 12, wherein the one or more rules engines are configured to only assign missions associated with the at least one mission type to vehicles having a required vehicle configuration for performing the at least one mission type.

14. The system of claim 12, wherein the one or more rules engines are configured to assign missions associated with the at least one mission type based on personnel qualifications to participate in the at least one mission type.

15. The system of claim 11, wherein the processor is configured to provide the generated software and/or map data to the one or more of the vehicles between periods of time when the fleet of autonomous vehicles is in service.

16. The system of claim 11, wherein the processor is configured to provide the generated software to the one or more of the vehicles prior to the upcoming period of time.

17. A non-transitory computer-readable medium that stores instructions that, when executed by at least one computing device, will cause the at least one computing device to perform operations comprising:

receiving data comprising:

a set of mission types, each mission type having an associated priority;

a set of mission requests to be performed during an upcoming period of time, each mission request having an associated mission type, the set of mission types comprising ride-sharing missions, vehicle-testing missions, and personnel-training missions, wherein the priority of the ride-sharing missions is greater than the priority of the vehicle-testing missions, and the priority of the vehicle-testing missions is greater than the priority of the personnel-training missions;

vehicle information related to a plurality of vehicles of a fleet of autonomous vehicles, the vehicle information comprising vehicle capabilities; and personnel information related to one or more personnel, the personnel information comprising personnel qualifications;

applying the set of mission types and the set of mission requests to one or more priority engines to produce a prioritized list of mission requests to be performed during the upcoming period of time;

applying the received vehicle information, the received personnel information, and the prioritized list of mission requests to one or more rules engines to produce, based on the personnel qualifications, personnel availability during the upcoming period of time, and the vehicle capabilities, a proposed schedule of missions to be performed during the upcoming period of time, such that each scheduled mission is assigned to a corresponding vehicle of the fleet of autonomous vehicles and corresponding one or more of the personnel;

based on its assigned mission, generating software for performing the assigned mission and/or map data for performing the assigned mission for one or more of the vehicles;

providing the generated software and/or map data to the one or more of the vehicles prior to the upcoming period of time; and operating the one or more of the vehicles according to the generated software and/or map data.

18. The non-transitory computer-readable medium of claim 17, wherein:

the vehicle information comprises vehicle configuration information; and for at least one mission type, the one or more rules engines are configured to assign missions associated with the at least one mission type based on the vehicle configuration information.

19. The non-transitory computer-readable medium of claim 18, wherein the one or more rules engines are configured to only assign missions associated with the at least one mission type to vehicles having a required vehicle configuration for performing the at least one mission type.

20. The non-transitory computer-readable medium of claim 17, wherein the instructions that cause the at least one computing device to perform operations comprising providing the generated software and/or map data to the one or more of the vehicles prior to the upcoming period of time comprise instructions that cause the at least one computing device to perform operations comprising providing the generated software and/or map data to the one or more of the vehicles between periods of time when the fleet of autonomous vehicles is in service.

* * * * *